(No Model.)

H. O. DORSEY.
FLOUR BOLT.

No. 368,879. Patented Aug. 23, 1887.

WITNESSES
Phil. E. Masi.
B. Fugitt.

INVENTOR
H. O. Dorsey.
Anderson & Smith
his Attorneys

UNITED STATES PATENT OFFICE.

HENRY OWEN DORSEY, OF NEWARK, OHIO.

FLOUR-BOLT.

SPECIFICATION forming part of Letters Patent No. 368,879, dated August 23, 1887.

Application filed August 19, 1886. Serial No. 211,283. (No model.)

*To all whom it may concern:*

Be it known that I, HENRY OWEN DORSEY, a citizen of the United States, residing at Newark, in the county of Licking and State of Ohio, have invented certain new and useful Improvements in Flour-Bolts; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to improvements in flour-bolts; and it consists in the construction and novel combination of parts, as hereinafter set forth and claimed.

Figure 1:
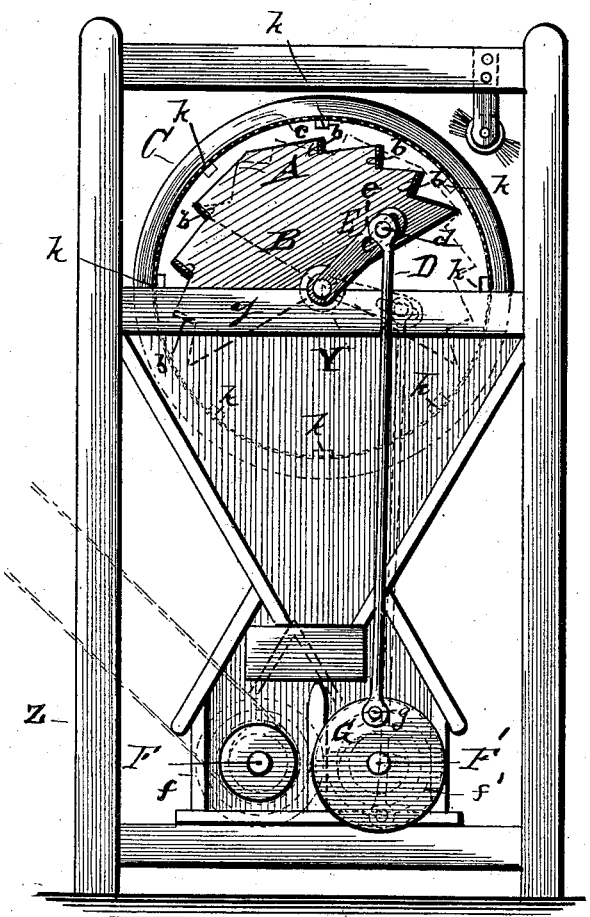
Figure 2:
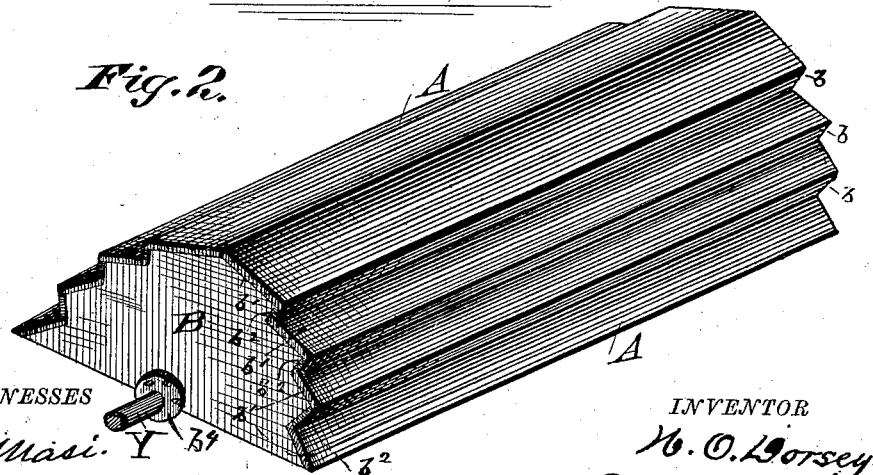

In the accompanying drawings, Figure 1 represents an end view of a machine embodying my invention. Fig. 2 represents a perspective view of the vibratory stepped deflector or distributer detached.

Referring to the drawings, Z represents the frame of the machine, and Y the shaft, upon which the deflector is secured, which shaft is journaled in the end beams, $y$, of the frame Z.

C is the reel secured within the frame Z, and provided with the bolting-cloth $c$, as shown in Fig. 1.

$k\ k$ are longitudinal ribs secured at equal distances apart within the reel, and acting as buckets to lift the material.

F and F' are shafts journaled in the lower part of the frame of the machine, and connected by the intermeshing gear-wheels $f\ f'$, as shown. A pulley on the shaft F is rotated by a belt from a pulley on any suitable source of power, and a disk, G, on the shaft F', is provided with a wrist-pin, $g$, on which is pivoted the lower end of the pitman D, the upper end of which has secured to it by a pin, $d$, that stands in the longitudinal slot $e$ of the crank-arm E, secured to the shaft Y.

The construction of the deflector-frame A is as follows: B B are similar end plates or boards, and having the disks $b^4\ b^4$ secured to them near at the centers of their lower edges, which disks are connected to the shaft Y, and prevent the ends of the deflector from abutting against the beams $y$. The end boards, B B, are cut away at intervals on each side of their tops to form the shoulders $b\ b$, which increase in depth toward the side edges of the frame to give a stepped formation. Upon these shoulders are secured the strips $b^2$, which form the "rise" of the stepped deflector, the "tread" thereof being formed by the strips $b'$, both sets of strips being suitably secured to the boards B B. The disk G, pitman D, crank-arm E, and shaft Y are so related to each other that the rotation of the said disk rocks the shaft Y, and so causes the frame A, secured thereto, to rock to an equal distance on each side thereof, so that the material fed down on the top of the frame is thrown alternately first to one side and then to the other. The shoulders $b$ increase in height from the apex of the frame, and the motion of the said shoulders is more deflective the farther they are from said apex, so that there can be no clogging of the material on the strips $b'$ and $b^2$ as the tops of the shoulders throw the material from the strips $b'$ above it to the similar strip below.

The material to be bolted enters the head of the reel from a conveyer of ordinary construction, and when the reel is rotated it is carried upward by the ribs toward the top of the reel, where it falls upon the deflector, and is distributed equally by the vibration thereof to each side of the reel, instead of falling to the bottom of the same. This causes the material to be acted on by a greater extent of the bolting-cloth than it would if allowed to fall directly to the bottom of the reel.

The reel is rotary, and may be actuated by any ordinary means.

Having described this invention, I claim—

1. The combination, with the cloth-covered reel, of the vibrating stepped deflector having its steps of increasing inclination downward, substantially as specified.

2. The combination, with the reel, of the vibrating frame composed of the end boards, B, provided with the shoulders $b$, increasing in height on each side toward its side edges, and the strips $b'\ b^2$, connecting said end boards, substantially as specified.

3. The combination of the reel C, the stepped vibrating frame A, having the end boards, B, provided with the shoulders $b$, and the connecting-strips $b'\ b^2$, and means, substantially as described, for actuating the vibrating frame, substantially as specified.

4. The combination of the reel F, the frame A, composed of the end board, B, provided with the shoulders $b$ and strips $b'\ b^2$, the shaft Y, supporting said frame, the slotted arm E on said shaft Y, the pitman D, and the disk G, rotating with the said shaft Y, and provided with the pin $g$, substantially as specified.

In testimony whereof I affix my signature in presence of two witnesses.

HENRY OWEN DORSEY.

Witnesses:
W. H. HENRY,
W. D. NUTTER.